(12) United States Patent
Habeck

(10) Patent No.: US 6,662,095 B1
(45) Date of Patent: Dec. 9, 2003

(54) METHOD OF DETECTING THE ROTATIONAL DIRECTION OF AN OUTPUT SHAFT DURING STARTING

(75) Inventor: Dirk Habeck, Langenargen (DE)

(73) Assignee: ZF Friedrichshafen AG, Friedrichshafen (DE)

(*) Notice: Subject to any disclaimer, the term of this patent is extended or adjusted under 35 U.S.C. 154(b) by 32 days.

(21) Appl. No.: 10/018,410

(22) PCT Filed: Jul. 1, 2000

(86) PCT No.: PCT/EP00/06148

§ 371 (c)(1),
(2), (4) Date: Dec. 13, 2001

(87) PCT Pub. No.: WO01/04639

PCT Pub. Date: Jan. 18, 2001

(30) Foreign Application Priority Data

Jul. 9, 1999 (DE) .......................... 199 32 052

(51) Int. Cl.⁷ .................. B60K 41/22; B60K 41/18; F16H 59/04
(52) U.S. Cl. .................. 701/51; 701/70; 477/47
(58) Field of Search .................. 701/1, 51, 70; 475/276, 278, 285, 210, 205, 206, 296, 275, 277; 477/47, 93, 904, 114, 900, 901, 34, 69, 115

(56) References Cited

U.S. PATENT DOCUMENTS

| | | | | |
|---|---|---|---|---|
| 4,602,525 A | * | 7/1986 | Moroto et al. | 74/689 |
| 4,648,289 A | * | 3/1987 | Kubo et al. | 74/866 |
| 5,549,525 A | | 8/1996 | Wendel | 477/93 |
| 5,586,953 A | * | 12/1996 | Abo | 477/47 |
| 5,788,040 A | | 8/1998 | Moorman et al. | 477/116 |
| 5,830,100 A | * | 11/1998 | Choi | 475/276 |
| 5,925,087 A | | 7/1999 | Ohnishi et al. | 701/70 |
| 6,393,928 B1 | * | 5/2002 | Watanabe | 74/336 R |

FOREIGN PATENT DOCUMENTS

| | | | |
|---|---|---|---|
| DE | 42 23 084 A1 | 11/1992 | F16H/59/66 |
| DE | 42 29 024 A1 | 3/1994 | B60K/41/02 |
| DE | 43 28 893 A1 | 3/1994 | F16H/59/02 |
| DE | 197 20 131 A1 | 11/1997 | B60K/23/02 |
| DE | 197 33 465 A1 | 2/1998 | B60K/41/26 |

* cited by examiner

Primary Examiner—Tan Q. Nguyen
Assistant Examiner—Dalena Tran
(74) Attorney, Agent, or Firm—Davis & Bujold, P.L.L.C.

(57) ABSTRACT

A method is proposed of detecting the rotational direction of the output shaft of an automatic transmission while the motor vehicle whose drive train is decoupled in rest position starts to roll. A rotational speed sensor (1) is provided, which outputs a signal produced by a transmitter wheel (2) during rotation of the output shaft of an electronic transmission control. A time-related behavior of a detected parameter (n_AB) is compared with appertaining characteristic values for a drive state in the forward travel (D) or reverse travel (R) in order to detect a drive state, a calculation of the synchronization point being carried out according to the detected drive state. In addition, a device is proposed for carrying out the method.

13 Claims, 3 Drawing Sheets

METHOD OF DETECTING THE ROTATIONAL DIRECTION OF AN OUTPUT SHAFT DURING STARTING

The Invention relates to a method for detecting the drive state while a motor vehicle starts to roll with a decoupling in the rest position wherein a rotational direction of a n output shaft of an automatic transmission is detected, and a device for carrying out the method.

From the practice are already known motor vehicles having an automatic transmission or an automated manual mechanical transmission in which is provided a decoupling in rest position of the drive train, also designated as stand-by-control (SBC), which is activated while the vehicle is stopped or almost stopped. In rest coupling, while a vehicle is parked, such decoupling of the drive train reduces a tendency for the vehicle to creep during an introduced gear which, in conventional automatic transmissions, occurs without actuating the brake as a result of the positive engagement. A reduction of the fuel consumption is increasingly desired with regard to minimizing the tendency to creep and to the emissions of exhaust gas that appear.

When a driver's wish to start is registered during the decoupling in rest position, e.g. by releasing the brake, the decoupling in rest position is terminated and a clutch to be engaged is pressurized according to the driving position introduced for forward or reverse travel depending on a calculated synchronization point.

The detection of the rotational direction of the output shaft of the transmission proves problematic here. To detect the output rotational speed, inductive sensors are often used in transmissions which are inaccurate in the range of low numbers of revolutions and become only active starting from higher numbers of revolutions than exist when starting a vehicle. To achieve a greater accuracy, Hall sensors are used in the practice. But with both kinds of sensors, it is not possible to detect the rotational direction of the output shaft with a single sensor since, for reasons of cost, the tooth flanks of the transmitter wheel are usually designed symmetrical and thus produce the same voltage signal independently of the rotational direction. Thus, in the evaluation of the voltage signal from which the output rotational speed is determined, the rotational direction of the output shaft cannot be determined.

Providing a second sensor or designing the transmitter wheel with asymmetric tooth flanks suggests itself for detecting the starting direction of the vehicle, but both result in considerably higher costs.

Especially in case of a sharp slope position, since a vehicle occasionally can start to roll after termination of the decoupling in rest position against the desired driving direction and introduced driving position for forward travel D or reverse travel R, but for lack of detection of the rotational direction of the output shaft by an electronic transmission control, this is not detected, the clutch to be engaged by the electronic transmission control is controlled in such situations according to the introduced driving position and not according to the actual driving state, i.e. especially not according to the actual relative rotational speed of the clutch to be engaged.

The calculation of the synchronization point and the control of the clutch to be engaged, which is usually hydraulically controlled until the synchronization point along a comfort ramp and thereafter, until a pressure jump to the main pressure level with a steeper pressure ramp, consequently are not carried out correctly when the vehicle starts contrary to the desired driving direction.

For example, despite when the vehicle's desired forward travel rolls uphill in reverse due to a very steep slope position, the synchronization point, which is mathematically determined from the product of input rotational speed by ratio, is detected as too soon for the actual conditions. The reversal of the rotational direction toward the front is, therefore, effected with a jolt clearly noticeable by the occupants of the vehicle.

Together with such impairments to comfort, a wrong calculation of the synchronization point resulting from an undesired starting direction has, as a consequence, problems of service life for the clutch to be engaged, since there is often provided an electronic signal of a reduced maximum engine torque as a mechanical transmission protection. As a rule, such engine engagement is canceled at the synchronization point in order to not impair the spontaneity of the vehicle unnecessarily long. In case of a synchronization point calculated too soon, an engine engagement also provided as transmission protection is discontinued too soon whereby a considerable thermal load can occur in case of high load requirements of the engine.

The problem, on which the invention is based, is to provide a method for detection of the rotational direction of an output shaft of an automated transmission during starting of the vehicle after termination of a decoupling in rest position which can be carried out at minimal construction cost and makes a correct control of the clutch to be engaged possible. A problem also solved by this invention is to provide a device for carrying out the method.

According to the invention said problem is solved by a method according to claim 1 and by a device according to claim 16.

The inventive method advantageously makes use of the knowledge that the qualitative and quantitative curve of an existing rotational speed signal which, in conventional manner, is permanently detected with a transmitter wheel having symmetrical tooth flanks and a reasonably priced conventional sensor, varies according to the rotational direction of the output shaft and therewith to the starting direction of the vehicle. When the vehicle starts contrary to the desired travel direction, the qualitative rotational speed curves differ from each other strongly between the desired drive state and the actual drive state.

The invention utilizes the knowledge in the manner that a time-related behavior of a determined parameter, preferably of the transmission output rotational speed, is compared with appertaining parameter sets characteristic for drive state in forward travel or reverse travel. When as a result of the qualitative and quantitative curve of the compared parameter, a specific drive state is detected. The synchronization point is calculated according to the detected drive state.

Thus, the rotational direction of the output shaft is detected with the inventive method independently of the signal generation of the transmitter wheel, which for the inventive method, can be designed at reasonable cost with symmetrically defined tooth flanks. According to the invention, since the rotational direction for starting operations in forward travel or reverse travel in automatic transmissions or in automated manual mechanical transmissions is detected only via a software logic, bearing in mind certain secondary conditions, the expense in sensors can be kept at a minimum so that only a conventional rotational speed sensor is required for detecting the rotational speed.

With the detection of the rotational direction of the output shaft and therewith of the starting direction of the vehicle, the synchronization point of the clutch to be engaged can be advantageously calculated according to the actual drive state. This means that, in case of selected forward travel direction but actual reverse rolling of the vehicle, the calculation takes place on a slope of the synchronization point taking into account the reverse rolling so that the pressure control of the clutch to be engaged can be chronologically and qualitatively carried out correctly with the greatest possible comfort and- clutch protection. This refers to a torque reduction optionally preset by a digital engine electronic system of the maximum admissible engine torque which, with the inventive method, is canceled at the actual point of synchronization. A clutch overload is thus prevented in case of an engine engagement eventually terminated too soon.

The invention will now be described, by way of example, with reference to the accompanying drawings in which.

Figure 1:
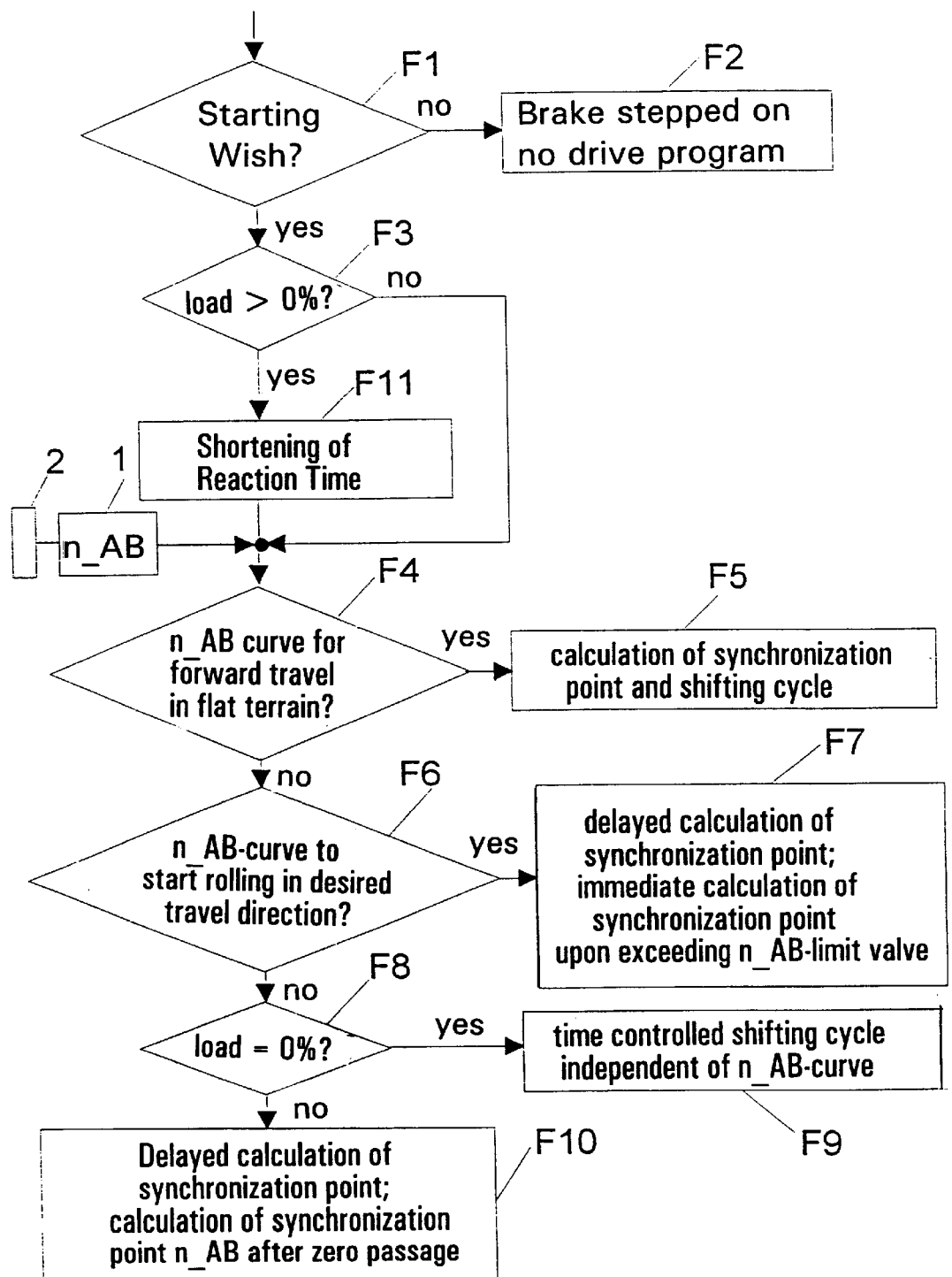
FIG. 1 is a flow diagram of a method for detecting the rotational direction of an output shaft of an automatic transmission during starting of a motor vehicle with decoupling in rest position.

Referring to FIG. 1, it shows an extensively schematized flow chart for determining the rotational direction of an output shaft of an automatic transmission during starting after canceling a decoupling in rest position of the drive train.

To carry out the method in an electronic transmission control, not shown in detail, which exchanges signals via a CAN (controller area network) databus with mathematical units of additional aggregates, a program module is provided which receives input signals from a rotational speed sensor 1, only symbolically indicated in FIG. 1 which, in turn, calipers a transmitter wheel 2 having symmetrical tooth flanks, only diagrammatically indicated.

As can be seen in FIG. 1, in a function F1 is first tested whether a starting wish signal exists, which is detected in the instant embodiment when a brake pressure p_b is lower than a preset limit value. In performances different from this, it is also possible to provide the deactivation of a brake signal as starting wish signal which, for example, can be polled on the databus as control bit of an electronic brake control or the deactivation of a brake lighting switch or the exceeding of a limit value of the output rotational speed n_AB.

In case no starting wish signal is present, it is assumed in a function F2 that the brake has been stepped on and no driving position has been introduced for forward travel D or reverse travel R.

In case a starting wish signal is detected, in a subsequent function F3 is tested whether a load requirement exists by actuating the accelerator pedal before an output rotational speed n_AB higher than zero is detected. If no load requirement exists, after detecting a determined output rotational speed n_AB, its curve is compared with rotational speed curves for different drive states stored in the electronic transmission control, it is first tested in a function F4 whether the actually existing rotational speed curve coincides with values or lines which are characteristic for starting in the flat terrain in forward travel. If this is the case, a corresponding calculation of the synchronization point are carried out in a function F5, the same as an appertaining shifting cycle.

In case the rotational speed curve does not coincide with the drive state "starting in forward travel on flat terrain," in another function F6 is tested in the flow chart shown whether a starting of the vehicle in the desired travel direction exists. This is established via the output rotational speed curve, the calculation of the synchronization point being delayed until the drive state is clearly stable.

Upon exceeding a preset limit value of the output rotational speed n_AB, when the vehicle rolls in the desired travel direction the calculation of the synchronization point is immediately started in a function F7.

When as a drive state, it results that the vehicle does not start in the desired travel direction, in another function F8 is tested whether a load requirement exists by means of an accelerator pedal actuation. If there is no load requirement, a function F9 is started which presets a time-controlled shifting cycle independently of the rotational speed curve and a time-controlled engine engagement.

On the other hand, when the vehicle starts contrary to the wished travel direction and simultaneous load requirement, a delayed calculation of the synchronization point after a zero passage of the output rotational speed n_AB or of a reversal of the rotational direction is effected and the shifting cycle for the actually existing travel direction is outputted in a function F10.

Figure 4:
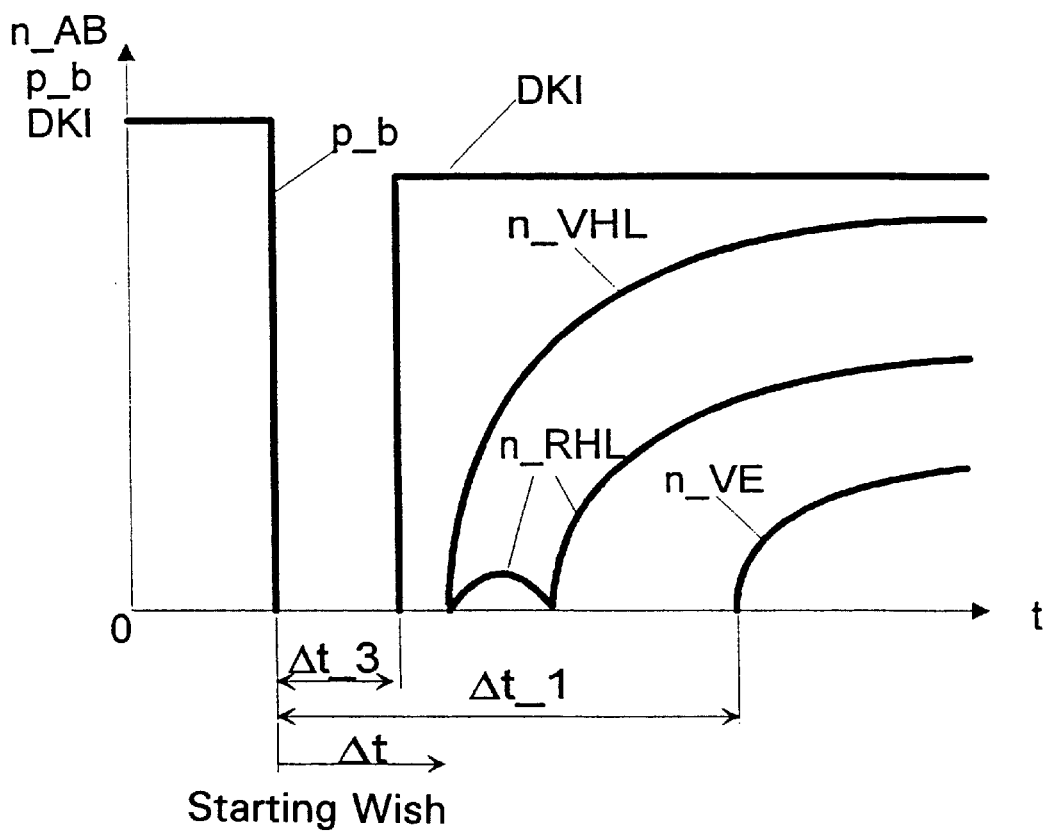
FIG. 4 is a diagrammatic representation of the curve of the definition of the rotational direction of the output shaft with a load requirement prior to detection of an output rotational speed.

When a load requirement has already been established in function F3 prior to detection of an output rotational speed n_AB higher than zero, this is taken into account in a function F11 added to function 4 for inquiring the existence of the drive state "forward travel in flat terrain" by an abbreviation of a reaction time Δt described in detail relative to FIG. 4

Figure 2:
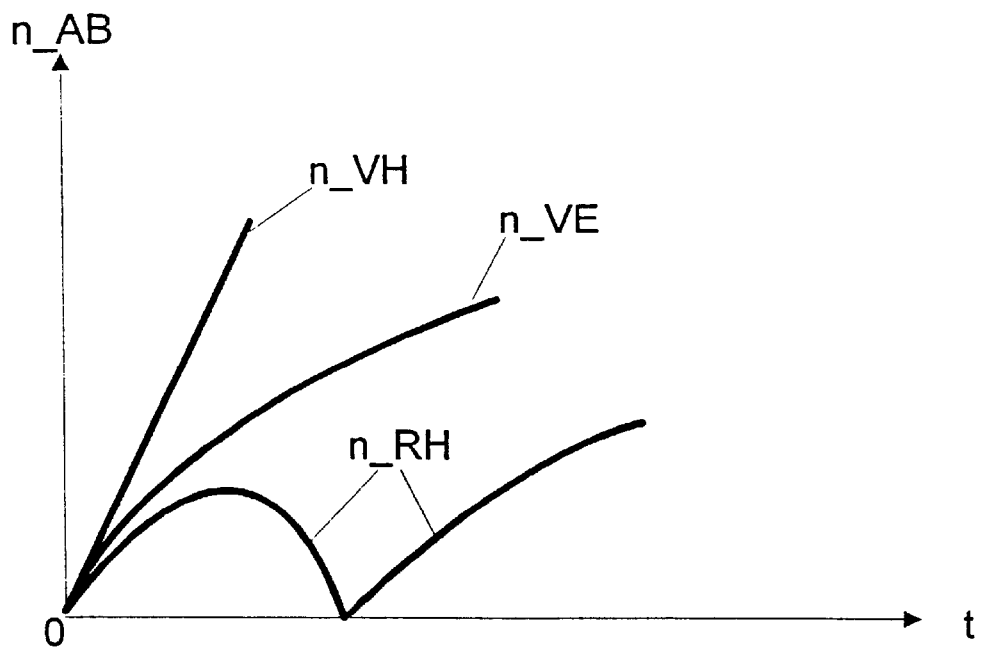
FIG. 2 is a schematized representation of time-related curves of an output rotational speed n_AB for different drive states.

FIG. 2 fundamentally shows characteristic rotational speed curves for the drive state "forward travel in flat terrain" which is reproduced by means of a characteristic line n_VE, for the drive state "forward travel on the slope downhill" in which the output rotational speed n_AB progresses according to a characteristic line n_VH and for the drive state "forward travel on the slope steeply uphill with rolling in reverse" according to a characteristic line n_RH. The rotational speed curves shown n_VE, n_VH and n_RH represent each drive states without load.

As is to be understood from the diagram in FIG. 2, the output rotational speeds in the different drive states have gradients that sharply differ from each other, the largest gradient being given in the drive state "forward travel on the slope down hill." Especially characteristic is the rotational speed curve n_RH in a starting operation on a steep slope uphill with initial reverse rolling, since the output shaft during activated decoupling in rest position rotates first with increasing velocity contrary to the desired direction, wherein the clutch to be engaged ever more strongly meshes and decelerates the output shaft to standstill and then drives with desired rotational direction.

In addition to the drive states shown, other characteristic lines for the drive states "forward travel uphill," "forward travel uphill," "reverse travel in flat terrain," "reverse travel downhill, "reverse travel uphill" and "reverse travel steeply uphill with reverse rolling" are stored respectively without load requirement and with load requirements according to the accelerator pedal position or a throttle valve angle DKI.

In the embodiment here described the transmission output rotational speed n_AB represents the determined parameter which is compared with stored characteristic lines. Differing from this other parameters determined, which are equivalent to the transmission output rotational speed n_AB such as the throttle valve angle DKI or the brake pressure p_b, can obviously be used for differentiation between the drive states.

Together with the gradient of the output rotational speed curve, an important criterion for differentiating between starting of the vehicle in flat terrain or on the slope forward or in reverse, is the reaction time Δt which can extend from the starting wish signal up to a detection of an output rotational speed n_AB higher than zero. The reaction time Δt is vehicle-dependent and stored according to characteristic values specific of the engine, a vehicle bulk, an axle ratio and a converter or starting element.

On the basis of the reaction time Δt between the starting wish signal which, in this case, is outputted by a jump-like drop of the brake pressure p_b when releasing the brake and the kind of ascent of the output rotational speed n_AB, it can be clearly detected when a starting takes place on the slope or in flat terrain.

Figure 3:
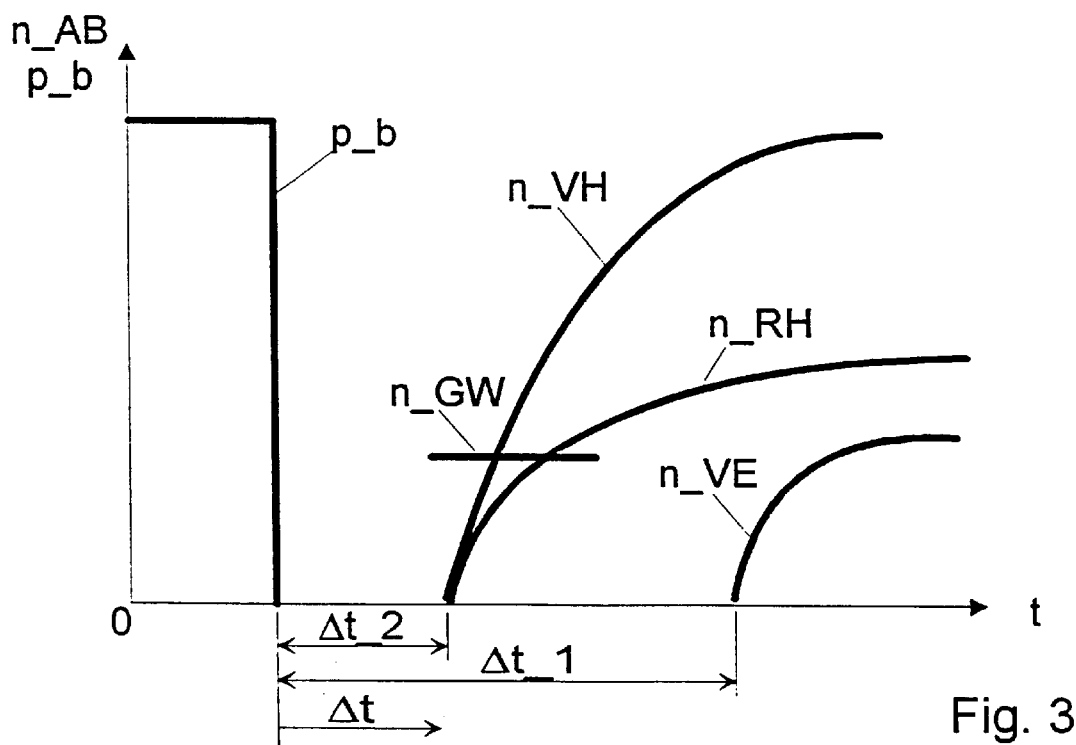
FIG. 3 is a diagrammatic representation of a time-related curve of detection of a rotational direction in a different drive states.

As FIG. 3 shows, measure is taken from the moment the brake pressure p_b drops on the time interval or reaction time Δt that lapses up to starting of the vehicle. For different drive states, certain reaction times are, in turn, characteristic like the Δ_1, Δt_2 shown. The longest reaction time Δ_1, shown in FIG. 3, corresponds to the time interval between starting wish signal and moving off in the drive state "forward travel in flat terrain without load" while in the shorter time interval Δt_2 a starting on the slope is detected.

Since on the basis only of the reaction time Δt_2 passed until starting, it is still not possible to detect in what direction the vehicle rolls on the slope, in order to distinguish the rotational direction of the output shaft, the quantitative curve of the permanently determined rotational speed n_AB up to a present rational speed limit n_GW is compared with the rotational speed curves stored in the electronic transmission control. Of the rotational speed curves, FIG. 3 shows, for example, the characteristic lines n_VH for the drive state "forward travel on the slope downhill" in which the output rotational speed n_AB, depending on the position of the slope, rises very quickly without load over the applicable limit value n_GW and the characteristic line n_RH for the drive state "forward travel on the slope with reverse rolling" is reproduced wherein the rotational speed gradient, like described with reference to FIG. 2, increasingly flattens when rolling contrary to the desired travel direction on a very steep slope and without subsequent actuation of the accelerator pedal as a result of the idling operation of the engine.

When detecting that the vehicle starts on the slope, calculation of the synchronization point is first delayed and does not start until the rotational direction of the output shaft is detected.

The limit value n_GW at which the rotational speed is compared, is applicable and selected so that an admissible difference is possible between forward rolling and reverse rolling on the slope.

The characteristic lines, shown in FIG. 3, each reproduce a drive state without load requirements, i.e. accelerator pedal actuation by the driver. In drive states without load requirement, the gradient on the slope can be applied according to the vehicle, i.e. via the output rotational speed n_AB, it is possible to detect the gradient of the slope. With adequate software linkage, it is thus advantageously possible to support a gradient sensor or even spare it.

FIG. 4 is shown the situation where a load is required after release of the brake and the advancing drop of the brake pressure p_b and before detection of an output rotational speed n_AB higher than zero. When detecting a load requirement, which is reproduced with the throttle valve angle DKI, and a reaction time Δt shorter than the predefined reaction time Δt_2 for a drive state when starting in slope position or the reaction time Δt_1 for rolling off in flat terrain, a reaction time Δt calculated up to the detection of an output rotational speed n_AB according to a time Δt_3 elapsed between the starting wish signal and the load requirements and to the accelerator pedal position or the throttle valve angle DKI, is shortened. Thereby the expected time-related increase of the output rotational speed n_AB is corrected in the sense that the reaction time is shortened as much as the load has been increased after the starting desire signal. With the abbreviation of the calculated reaction time Δt, the ramp pressure of the clutch to be engaged and the torque take-over thereof are increased.

The characteristic line n_VHL, shown in FIG. 4, represents here a drive state "forward travel uphill with load" and the characteristic line n_RHL, a drive state "forward travel uphill with reverse rolling and with load," wherein each characteristic line is associated with a specific throttle valve angle DKI. In case of strong load requirements, the corresponding characteristic lines would begin at a lower reaction time while the characteristic lines for the same drive states without load requirement start at a later moment, as shown in FIG. 4 by the characteristic line n_VE for the drive state "forward travel in flat terrain without load."

By moving the characteristic lines in direction of shorter reaction times, the detection of the rotational direction of the output shaft can be carried out sooner, a synchronization point calculation adapted to the actual drive state and a correspondingly improved pressure control of the clutch to be engaged being possible with a more comfortable shifting cycle.

| References | |
|---|---|
| 1 | rotational speed sensor |
| 2 | transmitter wheel |
| DKI | throttle valve angle |
| F1 | function, differentiation function |
| F2 | function, processing function |
| F3 | function, differentiation function |
| F4 | function, differentiation function |
| F5 | function, processing function |
| F6 | function, differentiation function |
| F7 | function, processing function |
| F8 | function, differentiation function |
| F9 | function, processing function |
| F10 | function processing function |
| F11 | function processing function |
| n_AB | output rotational seed |
| n_GW | rotational speed limit valve |
| n_VE | characteristic line of the output rotational speed for drive state "forward travel in flat terrain without load" |
| n_VH | characteristic line of output rotational speed for drive state "forward travel on the slope downhill without load" |
| n_VHL | characteristic line of output rotational speed for drive state "forward travel on the slope downhill with load" |
| n_RH | characteristic line of output rotational speed for drive state "forward on the slope uphill with reverse rolling without load" |
| n_RHL | characteristic line of output rotational speed for drive state "forward on the slope uphill with reverse rolling and with load" |
| p_b | brake pressure |
| t | time |
| t | reaction time |
| t_1 | reaction time until starting in flat terrain without load |
| t_2 | reaction time until starting on the slope without load |
| t_3 | time interval between starting with and load requirement |

What is claimed is:

1. A method for detecting, via a shifting element conducive to positive engagement, a start of motion of a motor vehicle that is initially in a decoupled state and in a rest position the method comprising the steps of:

outputting from a single rotational speed sensor associated with an output shaft of an automated transmission and to an electronic transmission control a signal representing rotation of the output shaft, determining a gradient value representing time-related gradient of the output rotational speed (n_AB) of a determined transmission output rotational speed (n_AB), and comparing the gradient value with appertaining values (n_VE, n_VH, n_VHL, n_RHL) characteristic for a drive state when the motor vehicle starts to roll in one of forward travel (D) and reverse travel (R), with each value (n_VE, n_VH, n_VHL, n_RH, n_RHL) being associated with one of the following drive states "forward travel on flat terrain";
"forward travel downhill";
"forward travel uphill";
"forward travel uphill with reverse rolling";
"reverse travel in flat terrain";
"reverse travel downhill";
"reverse travel uphill"; and
"reverse travel uphill with reverse rolling", the drive states being stored respectively both with and without load conditions, and calculating a synchronization point of at which engagement of the shifting element conducive to positive engagement is carried out according to the drive state.

2. The method according to claim 1, comprising using, as criterion for differentiating between the drive states, a reaction time ($\Delta t$) which extends from a starting wish signal up to a detection of an output rotational speed (n_AB) higher than zero.

3. The method according to claim 2, comprising using, the reaction time ($\Delta t$) according to characteristic values specific of at least one of the engine, to a vehicle bulk, to an axle ration and to a starting element.

4. The method according to claim 3, comprising controlling of at least one of the pressure of a clutch to be engaged and the maximum admissible engine torque preset according to the detection of the drive state.

5. The method according to claim 3, comprising starting the calculation of the synchronization point when a rolling off is detected on a slope if a difference is found in starting in forward travel direction or in reverse travel direction.

6. The method according to claim 2, comprising detecting the starting wish signal when at least one of a brake signal is deactivated, a brake pressure (p_b) is lower than a limit value and when the output rotational speed (n_AB) is higher than a limit value.

7. The method according to claim 1, comprising using a gradient of the output rotational speed (n_AB) as criterion for differentiating between the drive states.

8. The method according to claim 7, comprising detecting starting in forward travel in flat terrain as drive state when the output rotational speed (n_AB) continuously increases.

9. The method according to claim 1, comprising determining a slope gradient by means of the values stored in characteristic lines for drive states with a starting on the slope.

10. The method according to claim 9, comprising shortening the calculated reaction time ($\Delta t$) according to the time ($\Delta t\_3$) elapsed between the starting wish signal and the load requirement and to an accelerator pedal position (DKI).

11. The method according to claim 1, comprising using a transmitter wheel with symmetrically designed tooth flanks.

12. A method for detecting, via a shifting element conducive to positive engagement, a start of motion of a motor vehicle that is initially in a decoupled state and in a rest position, the method comprising the steps of;

detecting a rotational direction of an output shaft of an automated transmission when the motor vehicle starts to roll, outputting a signal, from a single rotational speed sensor, to an electronic transmission control produced by a transmitter during rotation of the output shaft and representation an output rotational speed (n_AB), detecting an actual drive state, determining a gradient value representing a time-related gradient of the output rotational speed (n_AB) of a determined transmission output rotational speed (n_AB), comparing the gradient value with appertaining values (n_VE, n_VH, n_VHL, n_RHL) characteristic for a drive state when the motor vehicle starts to roll in one of forward travel (D) and reverse travel (R), with each value (n_VE, n_VH, n_VHL, n_RH, n_RHL) being associated with one of the following drive states "forward travel on flat terrain";
"forward travel downhill";
"forward travel uphill";
"forward travel uphill with reverse rolling";
"reverse travel in flat terrain";
"reverse travel downhill";
"reverse travel uphill"; and
"reverse travel uphill with reverse rolling", the drive states being stored respectively both with and without load conditions, calculating a synchronization point at which engagement of the shifting element conducive to positive engagement is carried out according to the detected drive state, using a gradient of the output rotational speed (n_AB) as criterion for differentiating between the drive states, and detecting a start in a forward travel uphill with a reverse rolling downhill as the drive state when the output rotational speed (n_AB) for a short time increases with low gradient and then again becomes zero in order to accelerate again after the standstill.

13. A method for detecting, via a shifting element conducive to positive engagement, a start of motion of a motor vehicle that is initially in a decoupled state and in a rest position, the method comprising the steps of;

detecting a rotational direction of an output shaft of an automated transmission when the motor vehicle starts to roll, outputting a signal, from a single rotational speed sensor, to an electronic transmission control produced by a transmitter during rotation of the output shaft and representation an output rotational speed (n_AB), detecting an actual drive state, determining a gradient value representing a time-related gradient of the output rotational speed (n_AB) of a determined transmission output rotational speed (n_AB), comparing the gradient value with appertaining values (n_VE, n_VH, n_VHL, n_RHL) characteristic for a drive state when the motor vehicle starts to roll in one of forward travel (D) and reverse travel (R), with each value (n_VE, n_VH, n_VHL, n_RH, n_RHL) being associated with one of the following drive states
"forward travel on flat terrain";
"forward travel downhill";
"forward travel uphill";
"forward travel uphill with reverse rolling";
"reverse travel in flat terrain";
"reverse travel downhill";
"reverse travel uphill"; and
"reverse travel uphill with reverse rolling";
the drive states being stored respectively both with and without load conditions, calculating a synchronization point at which engagement of the shifting element conducive to positive engagement is carried out according to the detected drive state, using, as criterion for differentiating between the drive states, a reaction time ($\Delta t$) which extends from a starting signal up to detection of an output rotational speed (n_AB) higher then zero, and shortening a calculated reaction time ($\Delta t$) up to the detection of an output rotational speed (n_AB) when a load requirement exists after a starting wish and prior to detection of an output rotational speed.

* * * * *